United States Patent [19]

Gersbach et al.

[11] Patent Number: 5,371,766
[45] Date of Patent: Dec. 6, 1994

[54] CLOCK EXTRACTION AND DATA REGENERATION LOGIC FOR MULTIPLE SPEED DATA COMMUNICATIONS SYSTEMS

[75] Inventors: John E. Gersbach, Burlington; Ilya I. Novof, Essex Junction, both of Vt.; Joseph K. Lee, Raleigh, N.C.

[73] Assignee: International Business Machines Corporation, Armonk, N.Y.

[21] Appl. No.: 979,121

[22] Filed: Nov. 20, 1992

[51] Int. Cl.$^5$ .............................. H03D 3/24
[52] U.S. Cl. .................... 375/119; 375/120; 327/166; 327/291
[58] Field of Search ............... 375/106, 107, 110, 119, 375/120, 118; 328/63, 164, 109; 307/269, 234, 271, 601, 602, 514, 517; 370/100.1, 108, 85.4

[56] References Cited

U.S. PATENT DOCUMENTS

| | | | |
|---|---|---|---|
| 3,336,534 | 8/1967 | Gluth | 331/12 |
| 3,358,240 | 12/1967 | McKay | 329/122 |
| 3,484,555 | 12/1969 | Ching et al. | 179/15 |
| 3,810,235 | 5/1974 | Hopkins et al. | 340/174.1 |
| 4,012,598 | 3/1977 | Wiley | 178/69.1 |
| 4,137,505 | 1/1979 | Guanella | 329/124 |
| 4,584,695 | 4/1986 | Wong et al. | 375/120 |
| 4,773,085 | 9/1988 | Cordell | 375/120 |
| 4,841,551 | 6/1989 | Avaneas | 375/118 |
| 4,977,582 | 12/1990 | Nichols et al. | 375/118 |
| 5,077,529 | 12/1991 | Ghoshal et al. | 375/118 |
| 5,245,637 | 9/1993 | Gersbach et al. | 375/119 |

Primary Examiner—Tesfaldet Bocure
Attorney, Agent, or Firm—Calfee Halter & Griswold

[57] ABSTRACT

Clock extraction and data regeneration logic is provided for a multiple rate digital data communications system such as a local area network (LAN). The logic is implemented in adapters which connect stations in the LAN to other stations in the LAN via transmission media such as wire or fiber optic cable. The clock extraction and data regeneration logic is adapted to quickly recognize the speed at which the token ring is operating, thereby preventing a station on the ring from sending data onto the ring at a rate which does not match the operating frequency of the ring. The logic also performs, at multiple speeds of operation, clock extraction and data reconstruction of a signal received from another station in the ring.

17 Claims, 4 Drawing Sheets

CLOCK EXTRACTION AND DATA REGENERATION LOGIC FOR MULTIPLE SPEED DATA COMMUNICATIONS SYSTEMS

TECHNICAL FIELD

The present invention relates generally to digital data transmission systems and more specifically to logic for implementing clock extraction and data regeneration functions in multiple rate digital data communications systems.

BACKGROUND OF THE INVENTION

In digital data transmission systems, composite clock and data signals in binary form are transmitted over media such as wires or fiber optic cables from a transmission line transmitter to a transmission line receiver. The transmitter and the receiver in a data transmission system may each be a single computer or may each comprise a local area network (LAN) of computers.

An individual computer or station in a LAN may both send information to other stations in the LAN or receive information from other stations. The station attaches to the LAN when it desires to communicate with another station in the LAN, and detaches from the LAN when the communications are complete. If information received by a station is destined for a station further along the network, the receiving station must pass the information along the LAN to the next adjacent station, and so forth, until the information reaches its final destination.

The signal received by a particular station in the LAN is represented by pulses in a data stream defined by positive-going and negative-going transitions. The transmitting station in the LAN outputs the data signal at a predetermined frequency. The binary data waveform, however, is degraded with respect to its phase and frequency as it propagates along the LAN transmission media due to electrical noise and dispersion. This degradation of bits in the binary waveform could result in incorrect interpretations by the receiving station of bits sent by the transmitter station across the LAN transmission media.

To prevent incorrect interpretation of data bits sent across stations in the LAN, the receiving station must reconstruct the received signal, regardless of electrical noise and transmission media degradations. Such reconstruction can be achieved by sampling the received signal at a regular rate equal to the transmitted bit rate, and at each sample instant making a decision of the most probable symbol being transmitted. Typically, a threshold level is chosen to which the received signal is compared. Transitions above and below this level are deemed to be binary ones or zeros, depending on the type of encoding of the signal.

In addition to reconstructing received data signals prior to retransmission to adjacent stations in the LAN, any new information which the station outputs to the LAN must be transmitted at the same frequency as that at which the LAN is operating. Because LANs are capable of operating at different speeds, individual computers or stations in the LAN must be matched to the speed at which the LAN will be operating. Typically, the individual stations are programmed to the speed at which the LAN is to be operated. If the speed of the LAN is to change, the LAN must be taken down, and all the stations must be reprogrammed to the new speed at which the LAN will be operating. If a particular station is programmed to a speed of operation which is different than the speed at which the LAN is operating, any attempt by the station to attach to the LAN will result in bringing the LAN down.

Accordingly, it is believed that there is a need for providing a clock extraction and data regeneration mechanism for use in multiple rate digital data communications systems which determines the rate at which data is being transmitted in a multiple rate data communications system, and which regenerates received data free of distortion. It is an object of the present invention, therefore, to provide a high-speed, low-power digital mechanism for (i) detecting the data transmission rate at which a data communications system such as a LAN is operating, (ii) adjusting the data transmission rate of a station in the LAN to the detected rate before the particular station sends any data over the LAN, and (iii) reconstructing data signals received from previous stations in the LAN prior to retransmitting the signal to the following station, based on differences detected between the received signal and the locally generated clock signal.

SUMMARY OF THE INVENTION

According to the present invention, a clock extraction and data regeneration mechanism is provided for a multiple rate digital data communications system such as a local area network (LAN). The mechanism is implemented in hardware or a hardware/software combination, and is incorporated into adapters which connect stations in the LAN to other stations in the LAN via transmission media such as wire or fiber optic cable.

A particular LAN in which the present invention may be implemented is the IBM ® Token-Ring network, which may operate at a frequency of either 4 Mbits/sec or 16 Mbits/sec. The clock extraction and data regeneration logic is adapted to quickly recognize the speed at which the token ring is operating, thereby preventing a station on the ring from sending data onto the ring at a rate which does not match the operating frequency of the ring. The logic also performs, at multiple speeds of operation, clock extraction and data reconstruction of a signal received from another station in the ring.

The clock extraction and data regeneration logic comprises a programmable frequency clock pulse generator, a data edge sorting circuit, a bank of histogram counters, and data speed recognition logic for determining the rate at which the token ring is operating. The logic also includes clock selection logic and a clock multiplexer for extracting a recovered clock signal from a received data signal. A regenerator element such as an edge-triggered latch uses the recovered clock signal as a sampling signal for the received data signal, and outputs a recovered data signal which is sent over the token ring to the next station in the ring.

The programmable frequency clock pulse generator is programmable to output a clock signal at a frequency of either 4 Mbits/sec or 16 Mbits/sec, and a plurality n of phase-delayed local clock signals. The phase-delayed local clock signals operate at the same frequency as the local clock signal, each being shifted in time about 1/n of a local clock signal period. The data edge sorting circuit receives each of the n phase-delayed local clock signals and establishes n time intervals per period $T_{local}$ corresponding to these n signals. The sorting circuit also receives the incoming received data signal from the previous station in the ring, senses the positive and negative going transitions of pulses in the signal, and sorts the positive and negative going transitions into these n time intervals.

A plurality n of histogram counters counts the number of positive and negative going transitions occurring during its respective time interval, thereby providing a real time history of transitions in the received data signal. This real time history, or histogram, enables the data speed recognition logic to detect the frequency at which the received data signal, and hence the LAN, is operating. The histogram also provides an indication of the phase of the data signal with respect to that of the local clock signal, enabling a determination of the optimal sampling points of the received data signal for regeneration purposes.

DETAILED DESCRIPTION OF THE PREFERRED EMBODIMENT

Figure 1:
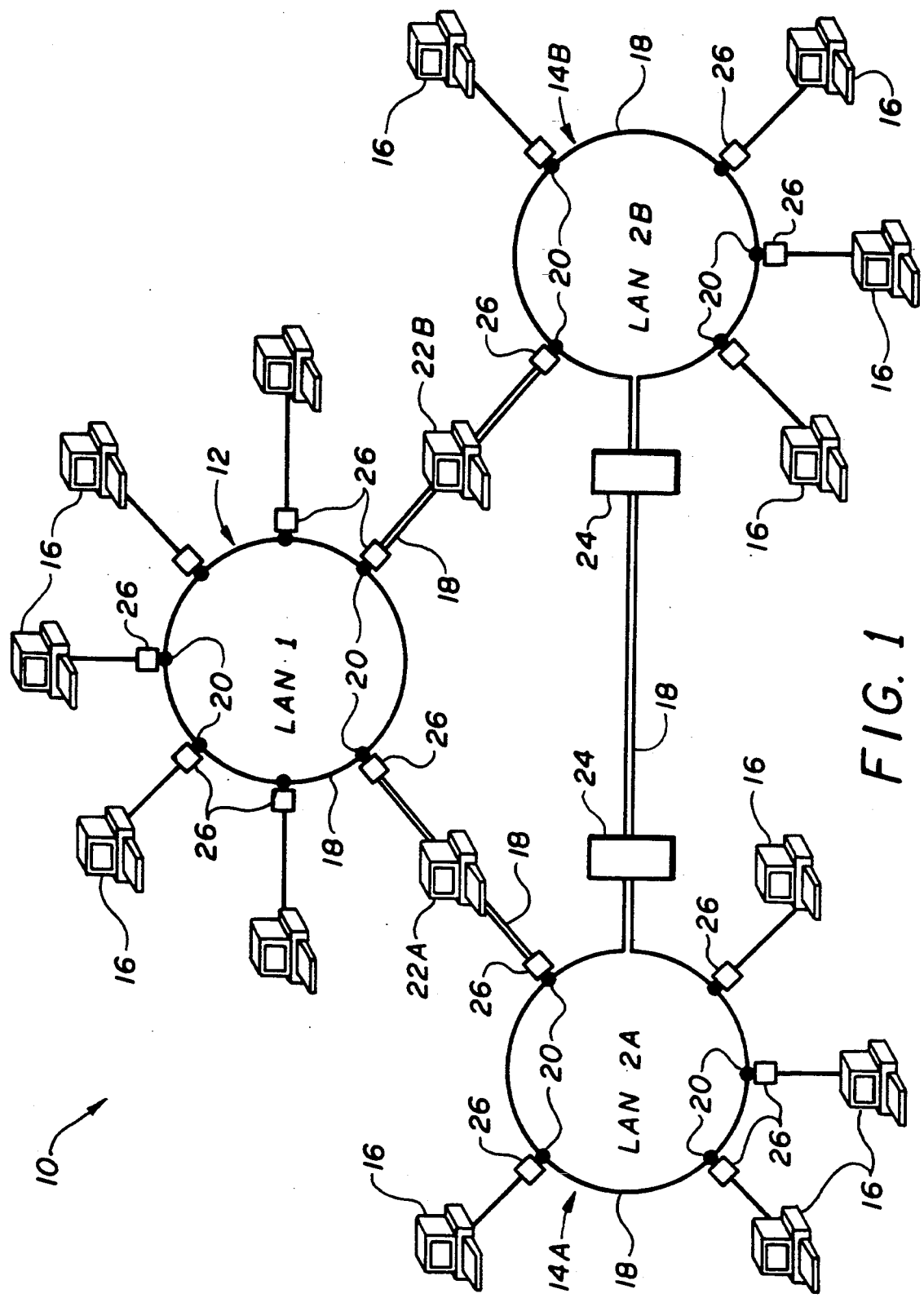
FIG. 1 shows a multiple speed communications system into which the clock extraction and data regeneration logic of the present invention is implemented.

FIG. 1 shows a multiple rate digital data communications system 10 into which is incorporated the clock extraction and data regeneration mechanism of the present invention. The system 10 comprises a first local area network (LAN) 12 and a second LAN represented by 14A and 14B. Each of the LANs is formed by a plurality of attachment devices or stations 16, such as personal computers, which are connected to each other by a transmission media 18. The transmission media may comprise a fiber optic cable or other type of known data transmission media, such as a shielded twisted pair of copper wires. The transmission media is also used to connect the individual LANs together. Of course, the system shown in FIG. 1 is by way of example only, and the present invention may be implemented in a multiple rate digital data communications system comprising a single LAN, or more than the two LANs shown.

In the preferred embodiment, a token ring topology is used to interconnect the attachment devices or stations 16 within the LAN. The token ring network allows unidirectional data transmission between stations in a ringlike circuit, by a token passing procedure. The ring topology permits tokens to be passed from a node 20 associated with a particular station 16 to another node in the ring. A node 20 that is ready to send data can capture the token and thereafter insert data for transmission.

The preferred token ring network is the IBM ® Token-Ring network, which permits high-bandwidth peer-to-peer connectivity for the individual stations 16. The IBM ® Token-Ring network may operate at a frequency of either 4 Mbits/sec or 16 Mbits/sec, and supports as many as 260 stations per ring. The IBM ® Token-Ring network utilizes a differential Manchester code to encode baseband digital waveforms, which is a digital encoding technique wherein each bit period is divided into two complementary halves. A transition at the beginning of the bit period represents one of the binary digits "0" or "1" while the absence of a transition at the beginning of a bit period represents the other binary digit.

As shown in FIG. 1, the first LAN 12 is connected to the second LAN 14A, 14B by bridges 22A and 22B. Bridges are typically used to connect separate LANs, using the same logical link control protocol but different medium access control protocols to facilitate accurate data transmission. The bridges are inserted into each of the LANs at a node 20 in the ring, similar to the manner in which a station 16 attaches to the ring.

Repeaters 24 are inserted between the portions 14A and 14B of the second LAN. A repeater is used to connect individual computers or stations within the same LAN but which are separated by large distances. The function of the repeaters is to reconstruct the transmitted signal within the same LAN in its original form, ideally without error.

The particular attachment devices or stations 16 in each of the LANS attach to the ring at a node 20 by means of an adapter 26. The adapter 26 provides the mechanism by which each of the stations gains access to the token ring to send and receive data. Adapters are also provided at each of the nodes on either side of the bridges 22A, 22B.

The clock extraction and data regeneration mechanism of the present invention is implemented in each of the adapters 26 associated with the LANs in the system. The mechanism is implemented in either hardware or a combination of hardware and software. Because the mechanism may be implemented primarily in digital circuitry, it is highly suitable for very large scale integrated circuit (VLSI) implementation.

Figure 2:
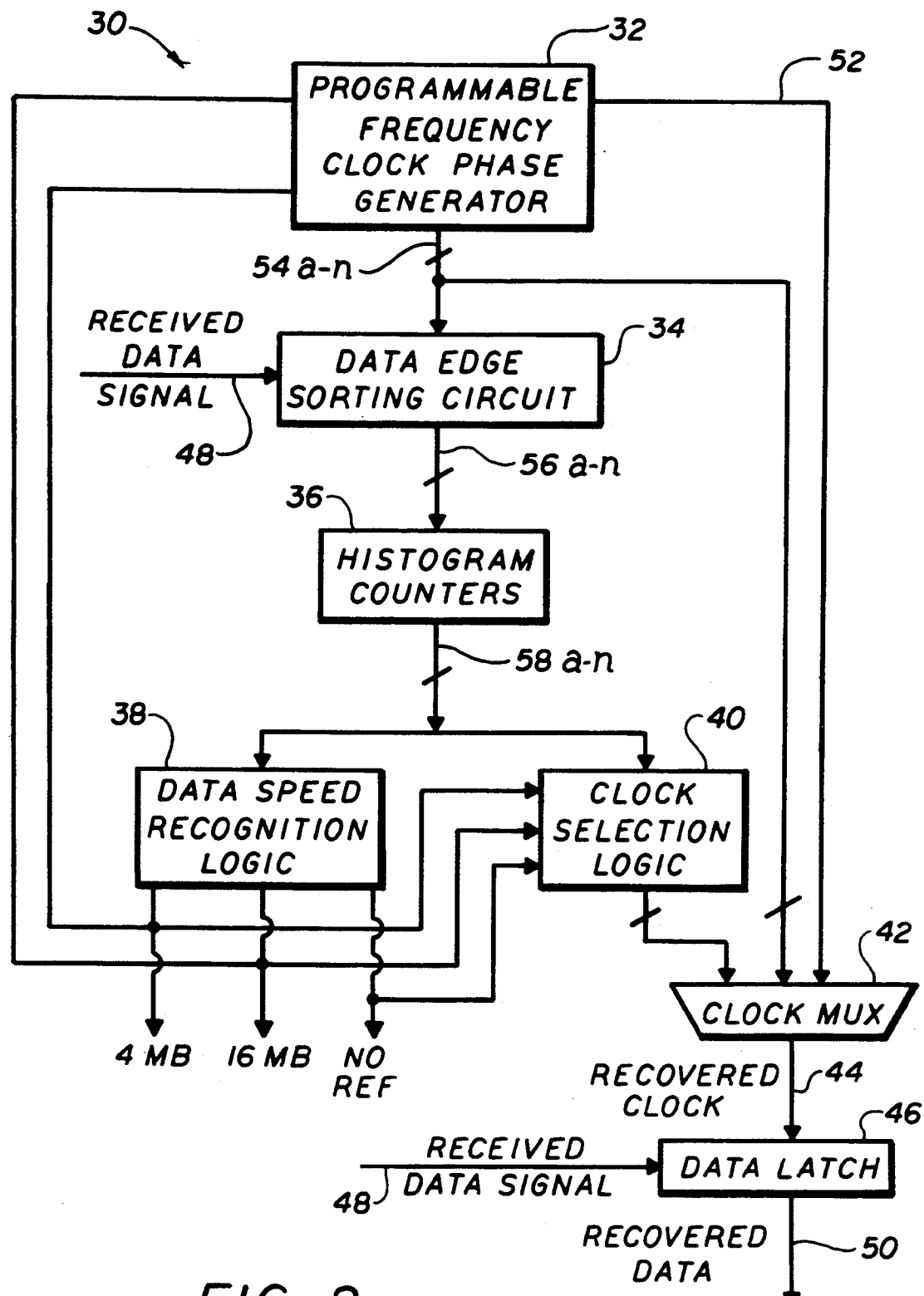
FIG. 2 is a schematic block diagram of the clock extraction and data regeneration logic implemented in the system of FIG. 1.

FIG. 2 shows a schematic block diagram of the clock extraction and data regeneration logic 30 implemented in the adapters 26. The logic 30 is adapted to quickly recognize the speed at which the token ring is operating (either 4 Mbits/sec or 16 Mbits/sec) before a particular station 16 sends data out onto the network. In this manner, a station 16 will be prevented from attaching to the network while in a mode to send data at a rate which is not matched to the rate at which the LAN is operating.

The logic 30 comprises a programmable frequency clock pulse generator 32, a data edge sorting circuit 34, a bank of histogram counters 36, data speed recognition logic 38 and clock selection logic 40. A clock multiplexer 42 receives outputs from the programmable frequency clock pulse generator 32 and the clock selection logic 40 and outputs a recovered clock signal 44. The recovered clock signal 44 is fed into an edge-triggered data latch 46 as a sampling signal for a received data signal 48. The latch outputs a recovered data signal 50 which is sent over the token ring to the next station in the ring. The clock extraction and data regeneration logic 30 associated with this next station treats the incoming signal as a received data signal. Accordingly, the logic 30 implemented in each of the adapters 26 in the system both (i) prevents the station associated with that adapter from attaching to the network while in a mode to send data at a rate which is not matched to the rate at which the LAN is operating, and (ii) performs clock extraction and data reconstruction of the received signal at multiple speeds of operation.

In the IEEE 802.5 token ring protocol, one station 16 in each ring or LAN is designated as a monitor station. The monitor station provides the master clock frequency (either 4 Mbits/sec or 16 Mbits/sec) at which the token ring will operate. All of the other non-monitor stations in the ring use the master clock as their system clock. When a particular station 16 attempts to attach to the ring, it enters a LISTEN mode, which will be further explained below. In the LISTEN mode, the adapter 26 on that station detects the speed at which the ring is operating, and thereafter sends data over the ring at that rate to prevent the disruption of ring activity which would otherwise occur if the station sent data over the ring at a mismatched speed.

If no stations are active on a particular ring, the ring is not operating at any speed, a state which is herein referred to as a NO REFERENCE condition. The first station which attempts to send or receive data over the ring, then, will enter the LISTEN mode and detect a NO REFERENCE condition. Upon detection of a NO REFERENCE condition, the first station becomes the master station, and its system clock serves as the master clock. Its system clock thereby defaults to a predetermined one of the selected system clock rates (either 4 Mbits/sec or 16 Mbits/sec), and the speed at which data is transmitted over the ring corresponds to this rate.

Referring back to FIG. 2, the programmable frequency clock pulse generator 32 is programmable to output a clock signal at a frequency of either 4 Mbits/sec or 16 Mbits/sec. The programmable frequency clock pulse generator 32 includes a local oscillator (not shown) which outputs a local clock signal 52 of either 4 Mbits/sec or 16 Mbits/sec, and a delay element (not shown) for establishing a plurality of phase-delayed local clock signals 54a–n.

The phase-delayed local clock signals 54a–n are of the same frequency as the local clock signal 52. The sum of the delays of the n phase-delayed signals corresponds to the period $T_{local}$ of the local clock signal 52. The period $T_{local}$ equals 125 nanoseconds for the 4 Mbits/sec rate or 31.25 nanoseconds for the 16 Mbits/sec rate. Each of these phase-delayed signals is shifted in time about 1/n of a local clock signal period. For example, for a local clock signal period $T_{local}$ and a resolution of 10%, ten phase-shifted signals are output by the delay element, each of the signals being shifted successively in time by $T_{local}/10$. Of course, more or less than ten phase-shifted signals may be implemented. Generally, the greater the number of phase-delayed signals output by the delay element, the greater the phase resolution. As an alternative to a delay element, a series of n gates could be used, each having an inherent propagation delay of $T_{local}/n$.

The data edge sorting circuit 34 provides an instantaneous indication of the approximate location in time of a data edge transition in the Manchester-coded received data signal 48 relative to the local clock signal 52. The data edge sorting circuit receives each of the n phase-delayed local clock signals 54a–n and establishes n time intervals per period $T_{local}$ corresponding to these n signals. The leading edge of one time interval occurs precisely at the trailing edge of a previous interval. The sorting circuit 34 also receives the incoming received data signal 48 from the previous station in the ring, senses the positive and negative going transitions of pulses in the signal, and sorts the positive and negative going transitions into these n time intervals.

When a particular station first attaches to the token ring, it enters the LISTEN mode wherein it reads the received data signal 48, and regenerates the signal for the next subsequent station. The received signal is sampled at the 4 Mbits/sec rate. In the LISTEN mode, however, the station does not send any data until it determines the rate at which the token ring is presently operating. The mechanism by which the station 16 determines this rate in the LISTEN mode involves the data edge sorting circuit 34, the histogram counters 36, and the data speed recognition logic 38, as further described below.

The output of the sorting circuit are n data sorts 56a–n. Because of the timing mismatch between the local clock signal 52 and the received data signal 48, positive and negative going transitions in the received composite signal do not occur simultaneously with corresponding transitions in the local clock signal. The output of the sorting circuit 34 thus provides an indication of the time intervals during which these transitions are occurring, and the phase shift of these transitions with respect to corresponding positive and negative going transitions in the local clock signal 52. By comparing the differences in frequency and phase of the received composite signal and the local clock signal, sampling times may be adjusted on a real time basis to enable continuous and accurate reconstruction of the originally transmitted signal.

The series of histogram counters 36 comprises counters 36a through 36n, one counter for each time interval established by the data edge sorting circuit 34. Each of the individual counters 36a–36n counts the number of positive and negative going transitions occurring during its respective time interval and stores this information by conventional means. Thus, the particular counts 58a–n associated with each of the n equal time intervals into which $T_{local}$ is divided provide a real time history of transitions in the received data signal, enabling development of a continuous histogram of the transition phase distribution with respect to the local clock signal. By determining in real time the phase of the data signal with respect to the local clock signal, the optimal sampling points of the data signal may be ascertained. These optimal sampling points vary over real time, and thus the system provides a determination of the optimal sampling points based on changing operating conditions.

Figure 3A:
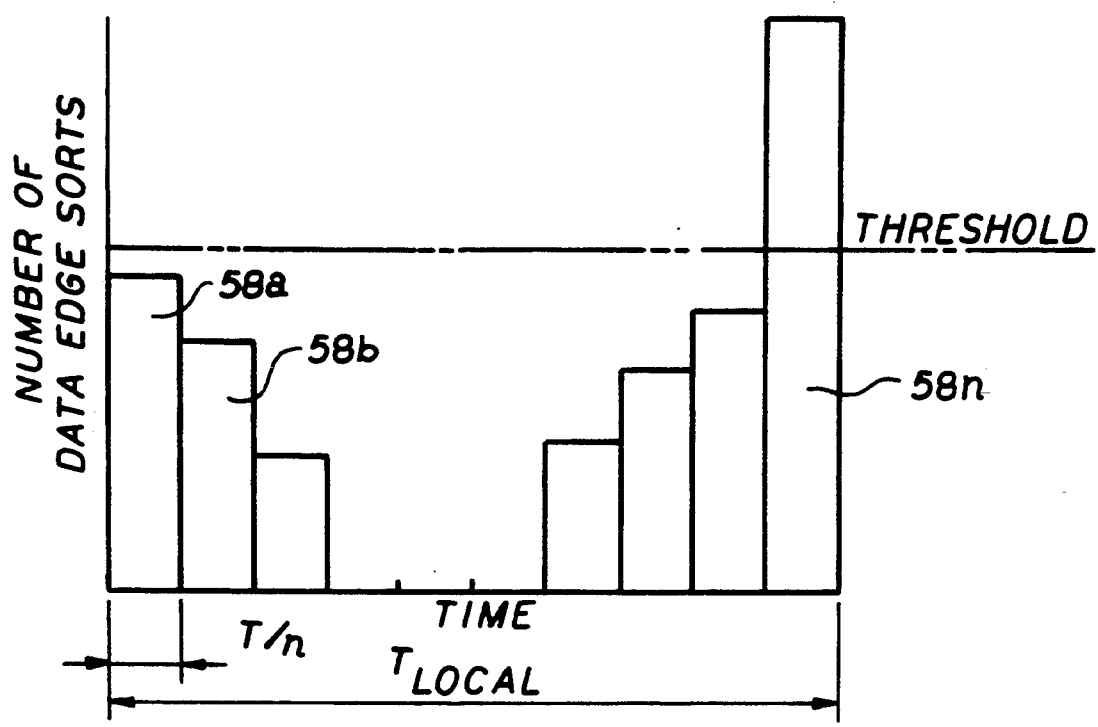
FIGS. 3A and 3B are histograms which provide an indication of the relative frequencies of a local clock output by the logic of FIG. 2 and a data signal received by the logic of FIG. 2.

If the frequency of the local clock signal 52 is equal to that of the received data signal 48, the histogram which is developed over time by the histogram counters 36 in the LISTEN mode will have a clearly defined peak. The transitions occurring at the beginning of a bit period of the received signal will be represented by a peak of transition counts near the beginning or the end of the bit period of the local clock signal. For example, in FIG. 3A, the histogram shown indicates that the local clock frequency is matched to the received signal frequency, because most transitions in the received signal coincide with the beginning and end of the local bit period $T_{local}$.

Figure 3B:
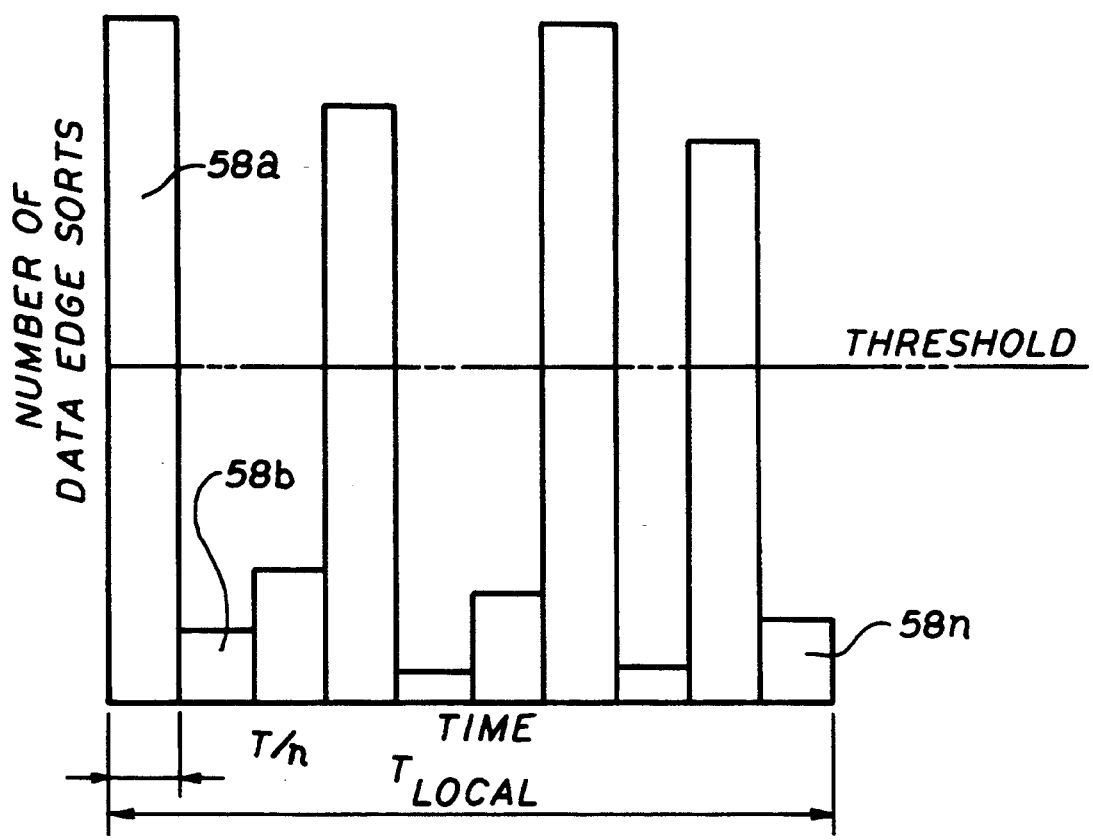

When the frequency of the received data signal 48 is a multiple of the frequency of the local clock signal 52, the histogram which is developed over time by the histogram counters 36 will have a number of clearly defined peaks. The number of peaks in the resulting histogram will be equal to the ratio of the frequency of the received data signal 48 over the frequency of the local clock signal 52. The transitions occurring at the beginning of a bit period of the received signal will be represented by that number of peaks of transition counts spaced generally evenly over the bit period of the local clock signal. For example, in FIG. 3B, four peaks are shown in the histogram, indicating that the frequency of the received data signal 48 is four times that of the local clock signal 52. In the preferred embodiment, this corresponds to a received data signal frequency of 16 Mbits/sec and a local clock signal frequency of 4 Mbits/sec.

If, however, a particular station 16 in the LAN is the first station attempting to attach to the token ring, a NO REFERENCE condition will be encountered by the station, as described above. Only random noise will be present on the received data signal line. Unlike the histograms of FIGS. 3A and 3B, no clear pattern of peaks will result in the histogram developed during a NO REFERENCE condition.

The data speed recognition logic 38 receives the outputs of the histogram counters and outputs a signal to set the frequency of the programmable frequency clock phase generator 32. The logic 38 determines the number of data edge sorts within a single local clock period which lie above a predetermined threshold, or the average number of data edge sorts within a larger number of clock periods. Based on the number of sorts which lie above the threshold, the data-speed recognition logic 38 selects the local clock frequency which matches the received signal frequency.

For example, if only one of the data edge sort counts per local clock period exceeds the threshold level (FIG. 3A), the local clock frequency is synchronized with the frequency of the received data signal, and the programmable frequency clock phase generator 32 continues to output a 4 Mbits/sec local clock signal. However, if four of the data edge sort counts per local clock period exceeds the threshold (FIG. 3B), the data speed recognition logic 38 commands the programmable frequency clock phase generator 32 to begin outputting a 16 Mbits/sec local clock signal. If a NO REFERENCE condition is detected, the local clock frequency remains defaulted at the 4 Mbits/sec rate.

The data speed recognition logic 38 also activates the clock selection logic 40, which reads the output lines of each of the histogram counters 36, analyzes the frequency distribution or histogram of this count data, and determines via the histogram real time changes in the phase and frequency of the received data signal 48 with respect to the local clock signal 52. The clock selection logic 40 thereby extracts timing information from the histograms to determine the optimum local clock phase at which sampling of the received data signal 48 should occur, which is the clock phase corresponding to the lowest number of data edge sorts in the histogram between successive peaks. This optimum local clock phase is selected from the plurality of phase-delayed local clock signals 54a–n output by the programmable frequency clock pulse generator 32.

The clock selection circuit 40 outputs the optimum local phase to the clock multiplexer 42. The multiplexer 42 extracts the recovered clock signal 44 and conducts the recovered clock signal 44 to any number of known regenerator elements. As shown in FIG. 2, the edge triggered latch 46 is used as the regenerator element and receives both the recovered clock signal 44 and the received data signal 48. The recovered clock signal is fed into the clock input of edge triggered latch 46 and is used as the sampling signal for the received data signal 48 which is fed into the data input of the latch. Data is latched upon either the positive or negative-going transitions of the clock input. Upon the occurrence of either a positive or negative-going edge of the sampling signal, the edge triggered latch outputs the signal present on the incoming clock and data line. This output is held until the next similar transition of the sampling signal. Thus, the recovered data output 50 of latch 46 is an accurate reconstruction of the originally transmitted signal.

The resolution of the above described clock extraction and data regeneration logic 30, with respect to its selection in the LISTEN mode of a local clock frequency which matches the received signal frequency, depends on the number of phase-delayed local clock signals 54a–n provided by the programmable frequency clock pulse generator 32. The accuracy of the logic 30, then, may be improved by additional phase-delayed local clock signals which provide more time intervals into which transitions in the received data signal may be sorted and counted.

Figure 4:
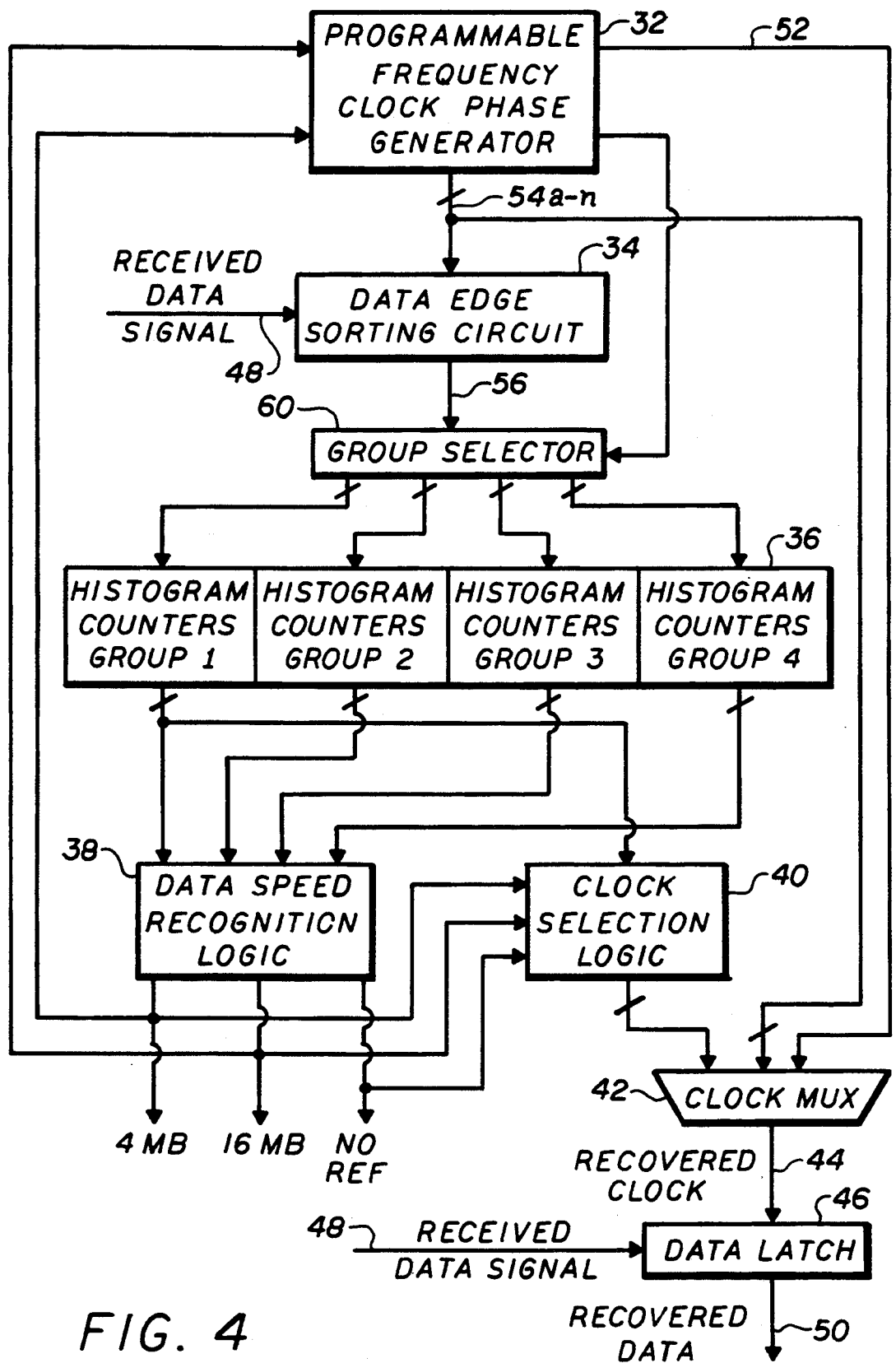
FIG. 4 is a schematic block diagram of an alternate embodiment of the clock extraction and data regeneration logic implemented in the system of FIG. 1.

FIG. 4 shows an alternate embodiment of the clock extraction and data regeneration logic 30, wherein additional phase-delayed local clock signals are provided. Instead of n phase-delayed local clock signals and n histogram counters, 4 n phase-delayed local clock signals and 4 n histogram counters are provided. Using the logic of FIG. 4, in the LISTEN mode the programmable frequency clock phase generator defaults to the 16 Mbits/sec rate of operation ($T_{local}=31.25$ nanoseconds). The programmable frequency clock pulse generator 32 switches the data sorts 56a–n from the data edge sorting circuit 34 from one group of histogram counters to the next by means of a group selector circuit 60.

In this manner, the logic of FIG. 4 will sort into 4 n time intervals the same number of transitions occurring in a 125 nanosecond time period that the logic of FIG. 2 sorts only into n time intervals. As a result, the histogram resulting from the four histogram counters will show better defined peaks, thereby enabling the data speed recognition logic 38 shown in FIG. 4 to more accurately select in the LISTEN mode the local clock frequency which matches the received signal frequency. At the same time, the clock selection logic 40 need only be provided with the output of one of the sets of histogram counters 36 with which to extract timing information to determine the optimum local clock phase at which sampling of the received data signal should occur.

Accordingly, the preferred embodiment of a clock extraction and data regeneration logic for a multiple speed data communications system has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A clock extraction and data regeneration circuit for a multiple rate digital data communications system, comprising:

a programmable frequency clock phase generator for outputting (i) a local clock signal operating at one of a selected number of frequencies corresponding to those at which the multiple rate digital data communications system operates and (ii) a plurality of phase-delayed clock signals each oscillating at the same frequency as that of said local clock signal, each of said phase-delayed clock signals being incrementally shifted in phase from said local clock signal by a distinct time period;

logic for receiving said plurality of phase-delayed clock signals, detecting the rate at which the multiple rate digital data communications system is operating based on an analysis of said plurality of phase-delayed clock signals, and outputting a control signal based on the detected rate which directs said programmable frequency clock phase generator to output said local clock signal at the detected rate; and sampling circuitry for regenerating a received data signal operating at the detected rate, and outputting a regenerated data signal.

2. The circuit of claim 1, wherein said logic for determining the detected rate at which the multiple rate digital data communications system is operating comprises (i) a data edge sorting circuit for receiving each of said plurality of phase-delayed clock signals and said received data signal, said sorting circuit defining a number of time intervals in each cycle of said local clock signal equal to the number of said plurality of phase-delayed clock signals, said sorting circuit being responsive to said received data signal to sort positive-going and negative-going transitions therein into the time intervals during which said transitions occur, and (ii) a plurality of counters each of which counts a number of said transitions occurring in a selected time interval; and wherein said logic for controlling said programmable frequency clock phase generator comprises data speed recognition logic for receiving the outputs of said plurality of counters and for outputting said control signal.

3. The circuit of claim 2, wherein said regeneration circuitry includes (i) a multiplexer for receiving said plurality of phase-delayed clock signals and outputting a recovered clock signal which most closely approximates the phase of the received data signal and (ii) a latch for receiving said recovered clock signal and said received data signal and outputting a recovered data signal.

4. The circuit of claim 2, wherein said multiple rate digital data communications system is a local area network of interconnected stations.

5. The circuit of claim 4, wherein said clock extraction and data regeneration circuit is implemented in adapter devices which interface each of said interconnected stations to said local area network.

6. The circuit of claim 5, wherein said local area network is an IBM ® token ring network.

7. The circuit of claim 5, wherein said selected number of frequencies at which the multiple rate digital data communications system operates include 4 Mbits/sec and 16 Mbits/sec.

8. The circuit of claim 2, wherein said frequency of said local clock signal defines a period T, said period T being divided into a number n time intervals, and wherein said plurality of phase-delayed clock signals equals a number n phase-delayed clock signals, each of said n phase-delayed clock signals being successively phase-shifted in time from said local clock signal by T/n.

9. The circuit of claim 8, wherein said data speed recognition logic reads count values of said plurality of counters at predetermined intervals, analyzes the frequency distribution history of counts in said counters, and outputs said control signal in response thereto.

10. A method of determining the speed at which a multiple rate digital data communications system operates, comprising the steps of:

outputting (i) a local clock signal operating at one of a selected number of frequencies corresponding to those at which the multiple rate digital data communications system operates and (ii) a plurality of phase-delayed clock signals each oscillating at the same frequency as that of said local clock signal, each of said phase-delayed clock signals being incrementally shifted in phase from said local clock signal by a distinct time period;

receiving said plurality of phase-delayed clock signals and detecting the rate at which the multiple rate digital data communications system is operating based on an analysis of said plurality of phase-delayed clock signals; and outputting a control signal based on the detected rate which directs said programmable frequency clock phase generator to output said local clock signal at said detected rate.

11. The method of claim 10, further comprising the step of regenerating a received data signal operating at said detected rate which has been degraded with respect to its phase in relation to said local clock signal.

12. The method of claim 10, wherein said step of determining the detected rate at which the multiple rate digital data communications system is operating comprises the steps of (i) receiving each of said plurality of phase-delayed clock signals and said received data signal, (ii) defining a number of time intervals in each cycle of said local clock signal equal to the number of said plurality of phase-delayed clock signals, (iii) sorting positive-going and negative-going transitions in said received data signal into the time intervals during which said transitions occur, and (iv) counting the number of said transitions occurring in each of said time intervals.

13. The method of claim 11, wherein said regenerating step comprises the steps of (i) receiving said plurality of phase-delayed clock signals and outputting a recovered clock signal which most closely approximates the phase of the received data signal and (ii) receiving said recovered clock signal and said received data signal and outputting a recovered data signal.

14. The method of claim 12, wherein said multiple rate digital data communications system is a local area network of interconnected stations.

15. The method of claim 14, wherein said local area network is an IBM ® token ring network.

16. The method of claim 15, wherein said selected number of frequencies at which the multiple rate digital data communications system operates include 4 Mbits/sec and 16 Mbits/sec.

17. The method of claim 12, wherein said frequency of said local clock signal defines a period T, said period T being divided into a number n time intervals, and wherein said plurality of phase-delayed clock signals equals a number n phase-delayed clock signals, each of said n phase-delayed clock signals being successively phase-shifted in time from said local clock signal by T/n.

* * * * *